United States Patent [19]

Hauser

[11] Patent Number: 5,041,067

[45] Date of Patent: Aug. 20, 1991

[54] DIFFERENTIAL GEARING TRANSMISSION

[75] Inventor: Hans Hauser, Strongsville, Ohio

[73] Assignee: Agri-Fab, Inc., Sullivan, Ill.

[21] Appl. No.: 506,558

[22] Filed: Apr. 9, 1990

Related U.S. Application Data

[63] Continuation of Ser. No. 221,679, Jul. 20, 1988, abandoned.

[51] Int. Cl.$^5$ .......................... F16H 37/00; F16H 7/12
[52] U.S. Cl. .................................... 475/211; 475/206; 474/84; 474/117; 474/135
[58] Field of Search ................... 74/689, 665 GE, 701, 74/740; 474/69, 77, 80, 83–89, 133, 134, 135, 117; 475/206, 211, 218, 221, 230, 323, 329

[56] References Cited

U.S. PATENT DOCUMENTS

| | | | |
|---|---|---|---|
| 2,219,184 | 10/1940 | Herman | 74/689 |
| 2,245,392 | 6/1941 | Drill | 74/689 |
| 2,360,076 | 10/1944 | Shaw | 74/689 X |
| 2,514,240 | 7/1950 | Hornbostel | 74/689 X |
| 2,623,410 | 12/1952 | Billey | 74/689 |
| 2,962,910 | 12/1960 | Wolfram | 74/665 GE X |
| 4,046,022 | 9/1977 | Henderson | 474/133 X |
| 4,138,837 | 2/1979 | Love | 74/740 X |
| 4,402,237 | 9/1983 | Tomlinson | 74/689 |
| 4,498,889 | 2/1985 | Stevens et al. | 474/135 X |
| 4,577,527 | 3/1986 | Shackelford | 474/133 X |
| 4,582,504 | 4/1986 | Schlapman et al. | 474/133 X |
| 4,651,592 | 3/1987 | Edwards | 74/689 |
| 4,726,256 | 2/1988 | von Kaler et al. | 74/689 |
| 4,728,318 | 3/1988 | Henderson | 474/117 X |
| 4,768,997 | 9/1988 | Page et al. | 74/689 X |
| 4,832,661 | 5/1989 | Wagner et al. | 474/69 |
| 4,862,767 | 9/1989 | Hauser | 475/83 |
| 4,942,780 | 7/1990 | Fujisaki et al. | 475/83 |

FOREIGN PATENT DOCUMENTS

| | | | |
|---|---|---|---|
| 115286 | 2/1900 | Fed. Rep. of Germany | 74/689 |
| 1127442 | 12/1956 | Fed. Rep. of Germany | 474/8 |
| 1575446 | 1/1970 | Fed. Rep. of Germany | 474/8 |
| 58-24645 | 2/1983 | Japan | 474/134 |

Primary Examiner—Allan D. Herrmann
Assistant Examiner—Benjamin Levi
Attorney, Agent, or Firm—Woodling, Krost & Rust

[57] ABSTRACT

A mechanical differential gearing transmission utilizing a plurality of parallel axis rotating shafts and an indirect pulley diameter control variator mechanism in order to provide an infinitely variable forward and reverse gearing between an engine and powered rotating wheels.

39 Claims, 4 Drawing Sheets

ന്ധ5,041,067

DIFFERENTIAL GEARING TRANSMISSION

This is a continuation of co-pending application Ser. No. 07/221,679, filed on July 20, 1988, now abandoned.

INTRODUCTION

This invention relates to a differential gearing power transmission. Differential gearing transmissions utilize a constantly engaged mechanism to alter the output of the transmission depending on which of a multiplicity of shafts to a certain mechanism are rotating faster than other input shaft. The U.S. Pat. No. 4,726,256 issued Feb. 23, 1988 is an example of such a transmission. This transmission, like others of its type, is complex with numerous external components. This present invention is directed towards providing a simple, self contained differential gearing transmission.

OBJECTS

It is an object of this invention to lower the cost of infinitely variable transmissions.

It is an object of this invention to simplify the installation of infinitely variable transmissions into vehicles.

It is an object of this invention to improve the strength of infinitely variable transmissions.

It is an object of this invention to improve the longevity of infinitely variable transmissions.

It is an object of this invention to facilitate the control of infinitely variable transmissions.

Other objects and a more complete understanding of the invention may be had by referring to the following specification and drawings in which:

DRAWINGS

DESCRIPTION OF INVENTION

Figure 1:
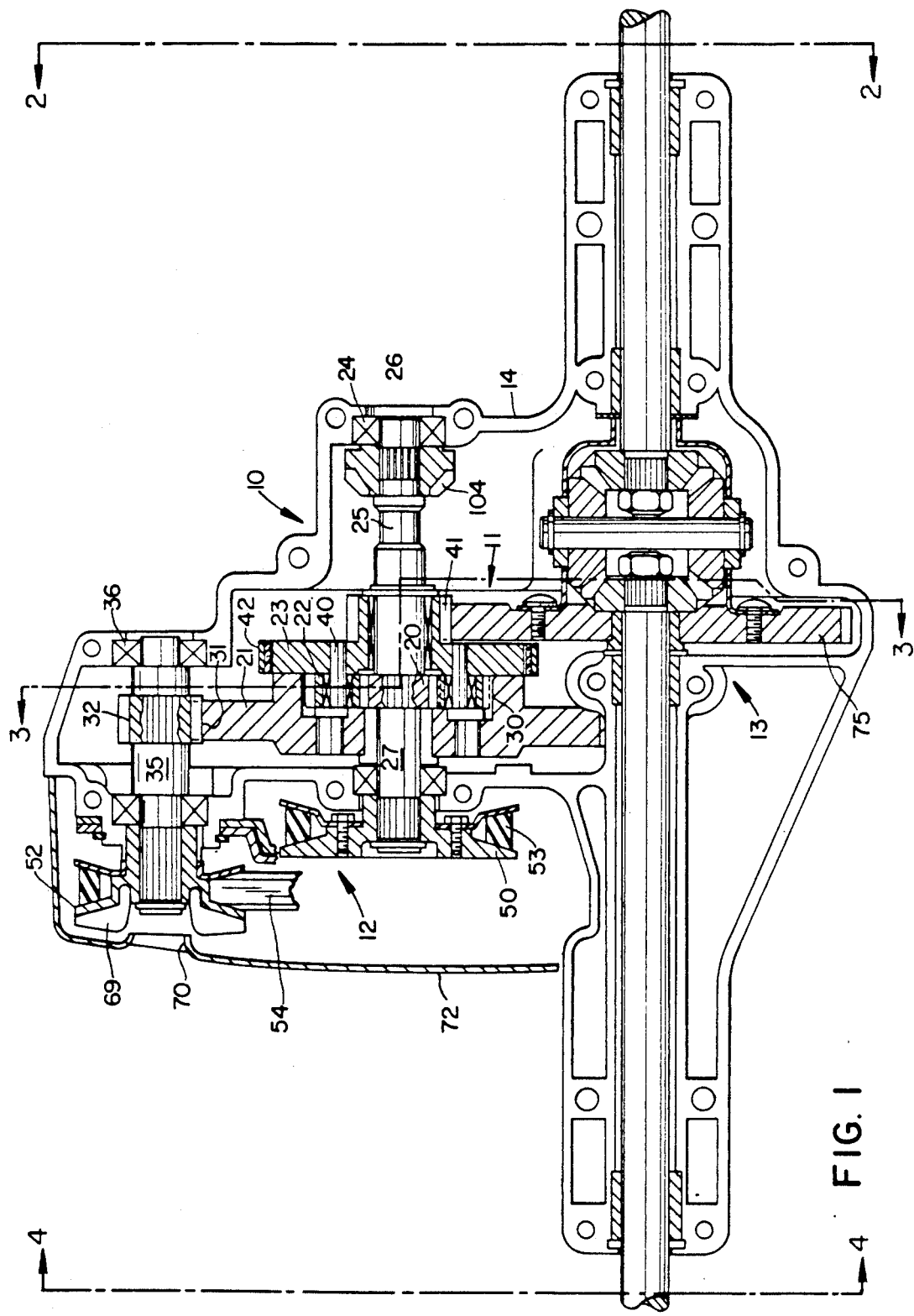
FIG. 1 is a longitudinal cross-sectional view of a transmission incorporating the invention.
Figure 2:
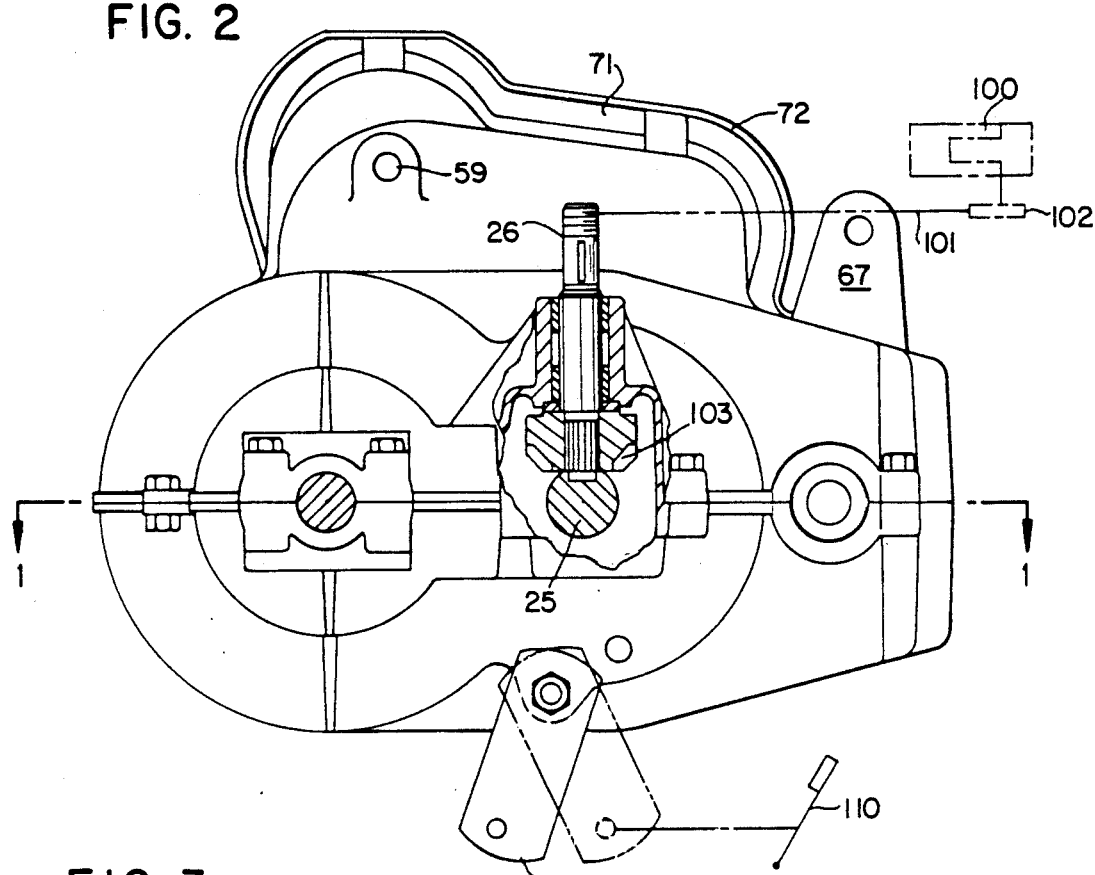
FIG. 2 is a lateral view of the transmission of FIG. 1 taken from the right side thereof as indicated.
Figure 3:
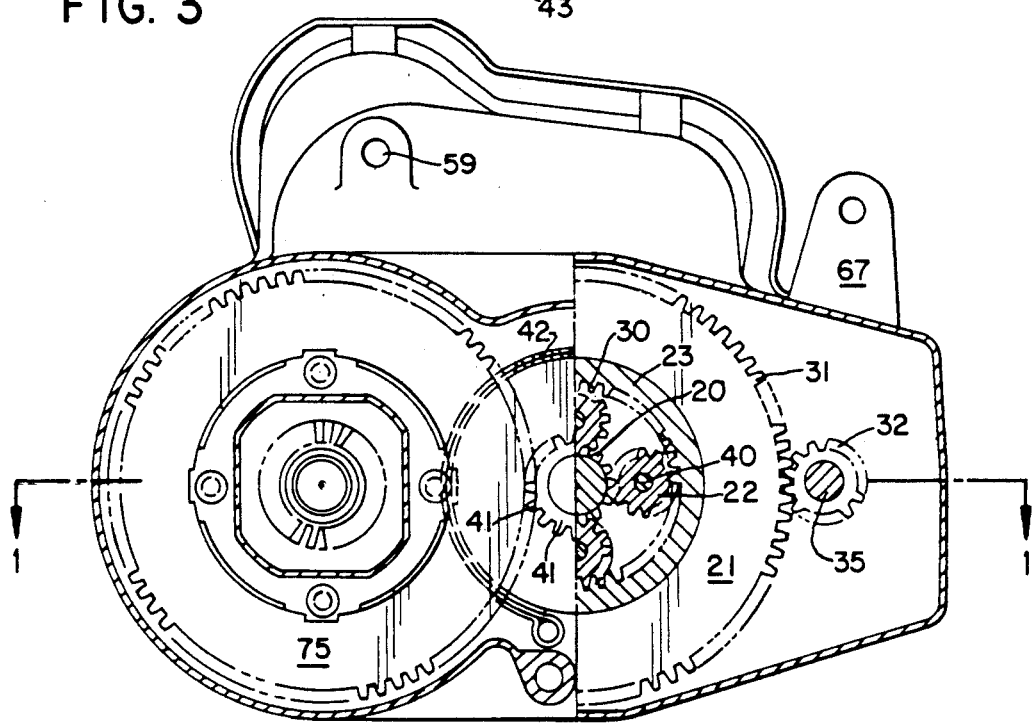
FIG. 3 is a lateral cross-sectional view of the transmission of FIG. 1 taken generally along lines 3—3 of that figure.

The preferred transmission 10 incorporating the invention of this application has a differential gear mechanism 11, a variator mechanism 12 and an output mechanism 13 all interconnected by a single housing 14.

The housing 14 for the transmission is bolted to the frame of an associated device, in the preferred embodiment shown a lawn tractor.

The differential gearing mechanism 11 is the main power transfer mechanism for the transmission 10, connecting the input torque from an engine 100 to the output mechanism 13. The amount and direction of this torque transfer depends on the relative rotation between two shafts into the differential gearing mechanism 11 (shafts and relative rotation later described). In the preferred transmission described the differential gearing mechanism 11 is an epicyclic differential utilizing a planetary device as the differential gearing mechanism 11. This particular planetary device utilizes a sun gear 20 input and ring gear 21 secondary driver with a planet gear 22/carrier 23 output. Other differential gearing mechanisms/connections could also be utilized.

The sun gear 20 is a twelve tooth spur gear machined directly onto a central rotary shaft 25 that in turn is rotatively mounted to the housing 14 by bearings 24. One end 26 of the central rotary shaft 25 is drivingly connected to the engine 100 (in the embodiment shown to a vertical shaft engine through a belt 101 and bevel gear set 103/104 combination) to form an input for the differential gearing mechanism 11. The engine 100 is preferably bolted to the frame of the vehicle separately from the housing 14. It is also preferred that the driving connection to the engine 100 include a clutch 102 of some sort so as to provide a positive drive release for the transmission 10, this even though since the transmission 10 has a neutral such release is not technically necessary. The other end 27 of the central rotary shaft 25 extends outwards of the housing 14 on the opposite side of the differential gearing mechanism 11 to provide power to the secondary driver of the variator mechanism 12 later described.

The ring gear 21 is rotatively mounted about the sun gear 20. In the preferred embodiment shown it is also rotatively mounted to the central rotary shaft 25 by a sleeve bearing alongside the sun gear 20. This additional support strengthens the mounting of the ring gear 21 by effectively lengthening the central axial bearing support for the ring gear 21. The ring gear 21 itself has thirty-two interior teeth 30 and seventy-two external teeth 31. The ring gear 21 is rotated through these external teeth 31 by a thirteen tooth gear 32 on a drive shaft 35 located radially outside of the ring gear 21. The drive shaft 35 is supported to the housing 14 by the ball bearings 36. This drive shaft 35 forms the secondary driver for the differential gearing mechanism 11. The ratio of the number of sun gear teeth (twelve) to the number of internal ring gear teeth (thirty-two) plus 1 provides a reduction for the preferred differential gearing mechanism 11 of about 3.66 to 1. The ratio of the drive shaft teeth (thirteen) to the external ring gear teeth (seventy-two) provides another reduction of about 5.538 to 1. These ratios reduce the torque load on the parts of the transmission preceding this differential gearing mechanism 11, including the variator mechanism 12. These two ratios significantly increase the output torque capabilities for the preferred transmission.

The planetary gears 22, four in number in the embodiment shown, are drivingly located between the sun gear 20 and the internal teeth 30 of the ring gear 21. The number of the planetary gears 22 and the number of teeth thereon are not critical as long as the strength and contact surfaces are there (the number of teeth being irrelevant to any ratio calculations etc). The planetary gears 22 in the preferred embodiment have thirteen teeth. These gears 22 are mounted to shafts 40 extending off of the planet carrier 23 such that any rotation of the axis of the planet gears 22 about the sun gear 20 causes the planet carrier 23 to rotate. As with the ring gear 21, the planet carrier 23 is also rotatively mounted to the central rotary shaft 25, in this embodiment by needle bearings. This additional support strengthens the mounting of the planet carrier 23 by effectively lengthening the central axial bearing support for the planet carrier 23. A seventeen tooth gear 41 on the planet carrier 23 forms the output for the differential gearing mechanism 11. Note that the additional support for the mounting of the planet carrier 23 underlies the seventeen tooth gear 41. The axial support for the carrier therefore also supports the output gear 41. This makes for a shorter, stronger device. A band brake 42 surrounds part of the planet carrier 23. Upon rotational movement of the brake lever 43 (normally activated by a foot pedal 110) a secondary lever in the transmission tightens the band 42 about the carrier 23 to stop the transmission 10. Note that since the carrier 23 has a relatively high speed reduction connection to the output mechanism 13 (later described) the application of the brake is relatively efficient. In addition the brake 42 is applied between the planetary gears 22 and the carrier output gear 41. This balances the forces on the brake 42.

The variator mechanism 12 is the main speed/direction control for the transmission 10. The variator mechanism accomplishes this by altering the relative speeds between the two driver shafts of the differential gearing mechanism 11. Since in the preferred embodiment shown one driver shaft (the sun gear 20) has a relatively constant rpm for a given engine setting, the variator mechanism 12 disclosed alters the relative speeds between inputs by varying the speed of the second driver shaft (the driver 35) to the differential gearing mechanism 11. This is preferred because it produces a simpler device than the traditional two shaft alternation.

The particular variator mechanism 12 disclosed has an input pulley 50, a split variator pulley 51, a secondary driver pulley 52, two belts 53, 54, a control pulley 56 and a takeup idler pulley 57. The input pulley 50 is fixedly connected to the end 27 of the central rotary shaft 25 for rotation therewith. The pulley 50 has a diameter of about 3.375 inches. The variator pulley 51 is a split pulley having two adjacent simultaneously variable diameter belt grooves 61, 62 separated by a movable central element 63. The pulley 51 shown has a diameter of from 3.375 inches to 1.875 inches. The variator pulley 51 itself is as a unit rotatively mounted to the housing 14 at a fixed location 59 near the top thereof. The secondary driver pulley 52 is fixedly connected to the drive shaft 35 (radially outside the ring gear 21) for rotation therewith. The pulley 52 shown has a diameter of about 2.375 inches. One belt 53 drivingly connects the input pulley 50 with one groove 61 of the variator pulley 51. The idler pulley 57 is located on a spring loaded 64 outwardly biased adjustment arm 65 so as to allow this belt 53 to effectively vary its length in response to the effective diameter of the groove 61 of the variator pulley 51 (change in effective diameter later described). The side tension required on the arm 65 is about 12.6 pounds when the arm 65 is in its low speed outermost position (FIG. 5) increasing slightly to 15.8 pounds when the arm 65 is in its innermost position (FIG. 4) with 13.7 pounds midrange. The second belt 54 is located adjacent to the first belt 53 drivingly connecting the other groove 62 of the variator pulley 51 to the secondary driver pulley 52. The operative control pulley 56 is located on a selectively movable spring 68 biased arm 66. The arm 66 itself has a lever 67 extending outside of the housing 14 for connection to a speed/direction lever 120. The side tension required on this arm 66 is greater than the spring bias on the other arm 65; the spring bias of the arm 65 is primarily a following takeup bias. In contrast with the arm 65 the spring loading of the arm 66 is 24 pounds for its outermost position (FIG. 4) dropping to 6.7 pounds for its innermost position (FIG. 5) with 12 pounds midrange. The spring loading of the adjustment arm 65 and operative control arm 66 work in combination together to provide the proper belt tension for the variator mechanism 12 with consideration for the pulley diameters, belt strengths, slip angles and other design parameters.

Figure 4:
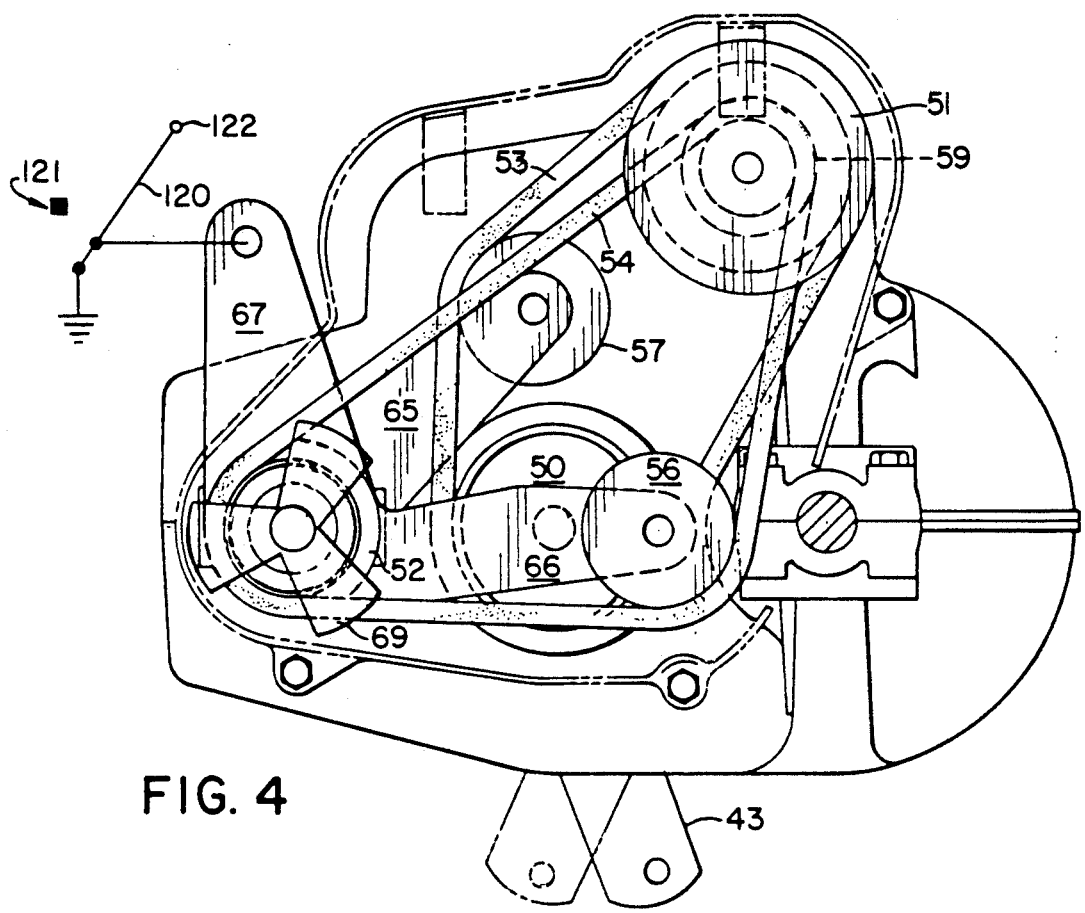
FIG. 4 is a lateral view of transmission of FIG. 1 taken from the left side thereof as indicated and showing the positioning of the power control belts in their full forward orientation.
Figure 5:
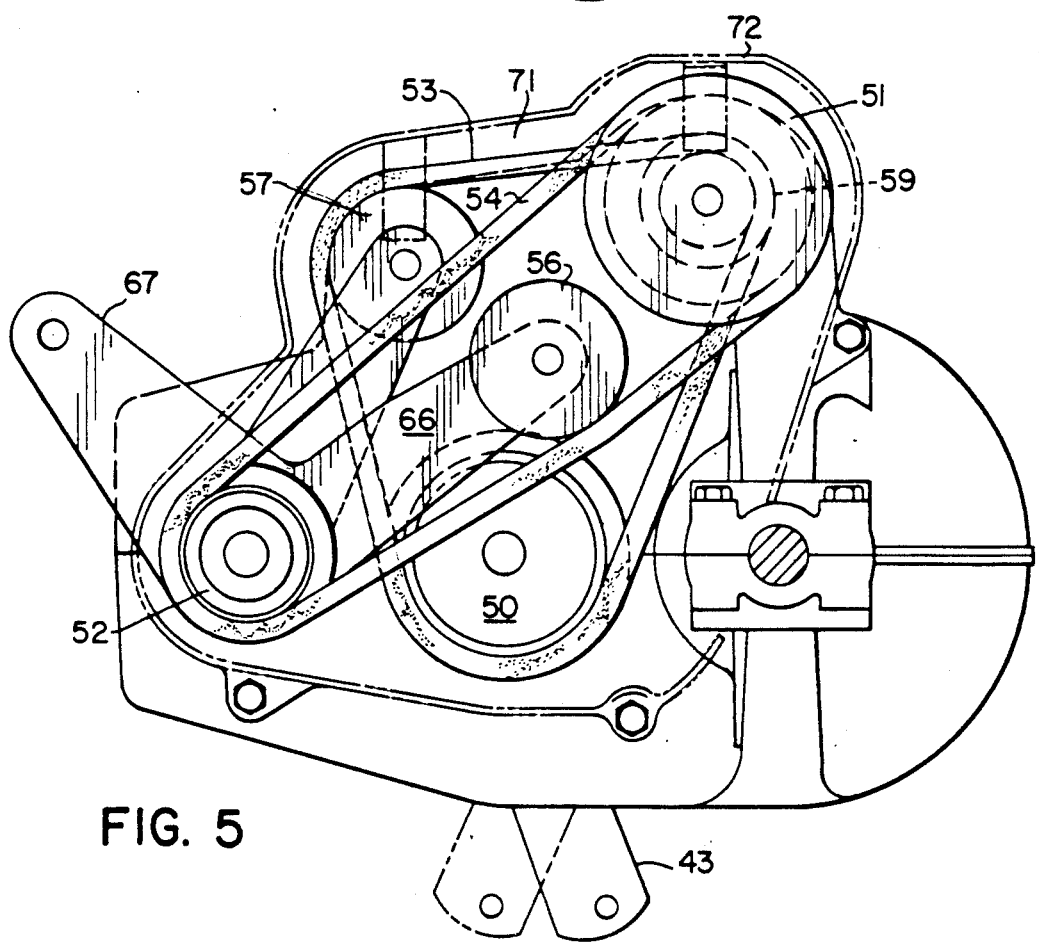
FIG. 5 is a lateral view like FIG. 4 showing the positioning of the power control belts in their full reverse orientation.
Figure 6:
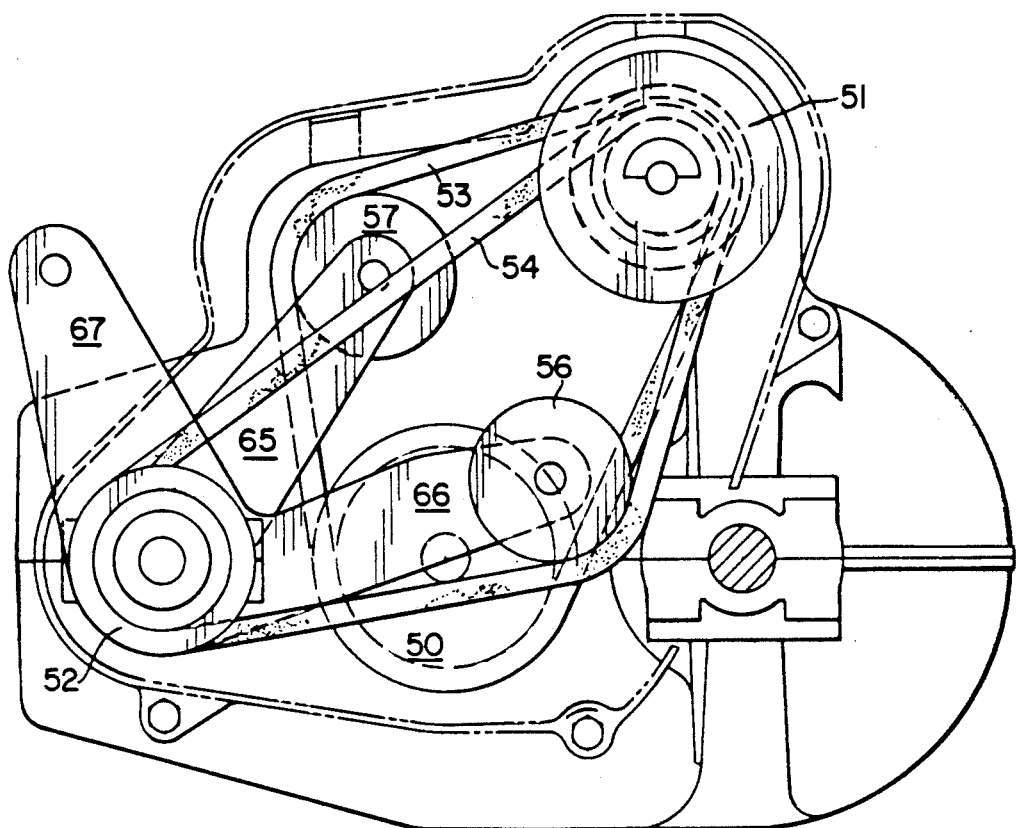
FIG. 6 is a lateral view like FIG. 4 showing the positioning of the power control belts in an intermediate position.
Figure 7:
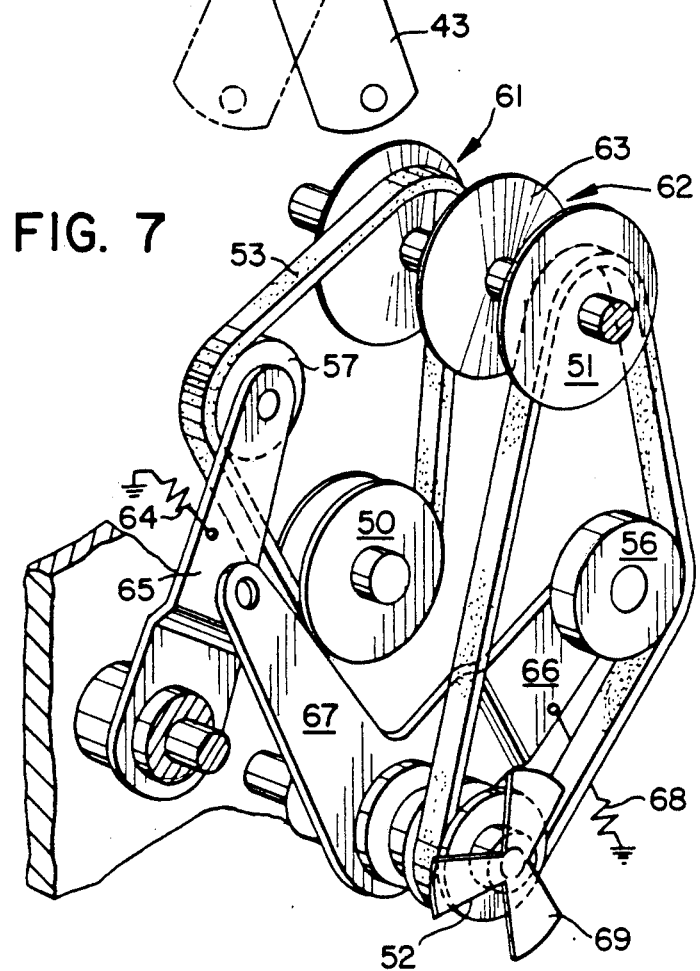
FIG. 7 is a perspective view of the variator mechanism of FIG. 1.

When the control arm 66 is physically moved, this physical movement varies the depth at which the belt 54 is located in the groove 62 of the variator pulley 51. For example upon clockwise movement of the arm 66, the belt 54 is physically pulled inwards in the groove 62 (much like a wedge into a log being split). The moveable central element 63 is in turn shoved towards the transmission housing 14 so as to allow this inwards movement of the belt 54. This central element 63 in turn physically pushes the belt 53 outwards in the groove 61 (much like an ice breaker being forced upwards between two icebergs). The reason for this is that the physical force on the central element 63 due to the inwards movement of the belt 54 is larger than the bias of the spring 64 holding the belt 53 inwards in the groove 61 (i.e., resisting movement of the central element 63). This inward positioning of belt 54 is shown in FIG. 4. The effect of this clockwise movement of the arm 66 is thus shortening the effective length of the belt 54. Upon counterclockwise movement of the arm 66, the tension on the belt 54 is released. There is, therefor, no force holding this belt 54 in place. At this time the bias of the spring 64 on the belt 53 begins to move the belt 53 inwards in the groove 61 towards the belt's 53 spring biased default inward position (again like a wedge). The moveable central element 63 is therefore shoved away from the transmission housing 14 so as to allow this inward movement of the belt 53. In that there is nothing holding the belt 54 in place, this central element 63 in turn physically pushes the belt 54 outwards int he groove 61 (again like two icebergs). The control arm 66 tracks with the belt 54. The inward positioning of the belt 53 is shown in FIG. 5. The effect of this counterclockwise movement is thus shortening the effective length of the belt 53. The selective positioning of the control arm 66 thus can reliably control the relative speeds of the two belts 53, 54 (and thus the transmission 10).

It is preferred that the transmission include some way of reliably setting the positioning of the control arm 66 to provide for a neutral setting. In the particular embodiment shown a 3000 rpm rotation of the central rotary shaft 25 will be cancelled out (i.e. the planet carrier 23 will not rotate) when the secondary driver pulley 52 (and drive shaft 35) is rotating at about 6230 rpm. In the preferred embodiment disclosed a stop 121, preferably adjustable for neutral, is included in the control arm 120 to accomplish this neutral setting (the adjustability removes consideration for wear). Pushing a button 122 on the end of the control lever 120 releases the lever 120 from the neutral stop 121 to allow the selective movement thereof. The transmission control means preferably includes a friction, ratchet or other means to hold the transmission in the selected operating mode. This would include a high friction disk.

In the embodiment shown there is a separate stamped steel cover 72 bolted to the housing 14 over the variator mechanism 12. The cover can easily be removed for maintenance of the variator mechanism 12, particularly the belts 53, 54, without further disassembly of the transmission 10 or the removal of the transmission 10 from its associated vehicle. In addition to its protective function, this cover 72 also contributes to the longevity of the device. In specific a fan 69 on the secondary driver pulley 52 draws air between opening 70 in the cover and an opening 71 between the cover 68 and the top of the housing 14. This air passes over and cools the variator mechanism 12.

In the preferred device disclosed the control lever 120 moves the control arm 66 to alter the speed of the output pulley 52 between 2340 rpm (FIG. 4) and 7968 rpm (FIG. 5). The idler pulley 57 automatically keeps the belt 53 taunt whatever the position of the control arm 66. The speed of the ring gear at these two extremes is 427 to 1385 rpm (due to the 5.538 reduction between shaft 35 and the ring gear 21). If the effective speed of the sun gear 20 is 1127 rpm (3000 rpm divided by the 3.66 reduction of the planetary mechanism minus 1), the planet carrier 23 rotates from 510 forward rpm (low speed ring gear—FIG. 4) to 228 reverse rpm (high speed ring gear FIG. 5). This provides the variable speed forward, neutral and reverse output for the differential gearing mechanism 11.

The output mechanism 13 transfers the output of the differential gearing mechanism 11 to useful work, in the preferred embodiment ground travel. The output mechanism 13 shown is a two pinion gear differential similar to that described in the U.S. Pat. No. 4,455,889 by Mr. Hans Hauser. The drive gear 75 for this differential has seventy two teeth. This provides for an additional 4.235 reduction in the transmission 10 for an overall transmission output of from forward 120 rpm to reverse 53 rpm for a constant 3000 rpm input to the transmission 10, the exact speed and direction depending entirely on the position of the control lever 67. This provides for a 6.30 mph forward speed and a 2.30 mph reverse speed in a typical lawn tractor application in a vehicle having an 18" diameter wheel.

Although this invention has been described in its preferred form with a certain degree of particularity, it is to be understood that numerous changes may be made without departing from the invention as hereinafter claimed for example by extending the shaft 25 longitudinally out of the housing 14 and eliminating the bevel gear set 102, the transmission would have an input suitable for use with a horizontal shaft engine. Other modifications are also possible:

What is claimed is:

1. An improved differential gearing transmission for use with a source of power comprising a differential gearing mechanism, said differential gearing mechanism having two driver shafts and an output with the rotation of said two driver shafts acting through said differential gearing mechanism to rotate said output, a drive belt, said drive belt connecting one of said two driver shafts to the source of power, an input pulley, a variator pulley, a driver pulley, said input pulley being connected to said one of said two driver shafts, a first belt, said first belt connecting said input pulley to said variator pulley, said first belt being different than said drive belt, said driver pulley being connected to the other of the two driver shafts, a second belt, and said second belt connecting said variator pulley to said driver pulley.

2. The improved transmission of claim 1 characterized in that said variator pulley has two grooves with said first belt engaging one of said two grooves and said second belt engaging the other of said two grooves.

3. The improved transmission of claim 2 wherein said two grooves have effective diameters and characterized in that a movable central element separates said two grooves, said movable central element varying the effective diameter of said two grooves simultaneously.

4. The improved transmission of claim 3 characterized by the addition of means to selectively cause the movement of said movable central element so as to vary the effective diameter of said two grooves.

5. The improved differential gearing transmission of claim 1 wherein said variator pulley has an effective diameter and characterized by the addition of means to alter the effective diameter of said variator pulley so as to alter the relative speeds between said input pulley and said driver pulley.

6. The improved transmission of claim 1 wherein the differential gearing transmission has a housing and the axis of rotation of said variator pulley is fixed in respect to the housing of the differential gearing transmission.

7. An improved differential gearing transmission for use with a source of power comprising a differential gearing mechanism, said differential gearing mechanism having two driver shafts and an output with the rotation of said two driver shafts acting through said differential gearing mechanism to rotate said output, a drive belt, said drive belt connecting one of said two driver shafts to the source of power, means to power the other of said two driver shafts, said means to power the other of said two driver shafts including an input pulley and a variator pulley and a driver pulley, means to connect said input pulley to said variator pulley, a first belt, said first belt being different than said drive belt, said first belt connecting said input pulley to said variator pulley said driver pulley being connected to the other of the two driver shafts, a second belt, said second belt connecting said variator pulley to said driver pulley, said variator pulley having two grooves, said first belt engaging one of said two grooves of said variator pulley, said second belt engaging the other of said two grooves of said variator pulley, said two grooves having effective diameters, a movable central element separating said two grooves of said variator pulley, said movable central element varying the effective diameters of said two grooves simultaneously, means to selectively cause the movement of said movable central element so as to vary the effective diameter of said two grooves, one of said first belt and said second belt having an effective length, said means to selectively cause the movement of said movable central element including an operative arm and said operative arm selectively altering the effective length of one of said first belt or said second belt with such selective alteration of said effective length moving said central element of said variator pulley.

8. The improved transmission of claim 7 wherein the differential gearing transmission has a housing and the axis of rotation of said variator pulley is fixed in respect to the housing of the differential gearing transmission.

9. An improved differential gearing transmission comprising a different gearing mechanism, said differential gearing mechanism having two driver shafts and an output with the rotation of said two driver shafts acting through said differential gearing mechanism to rotate said output, means to power one of said two driver shafts, means to power the other of said two driver shafts, said means to power the other of said two driver shafts including an input pulley, a variator pulley and a driver pulley, means to connect said input pulley to power, means to connect said input pulley to said variator pulley, said driver pulley being connected to the other of the two driver shafts, means to connect said variator pulley to said driver pulley, and said means to power the other of said two driver shafts being on the opposite side of said differential gearing mechanism from said means to power one of said two driver shafts.

10. An improved differential gearing transmission for an engine comprising a differential gearing mechanism, said differential gearing mechanism having two driver shafts and an output with the rotation of said two driver shafts acting through said differential gearing mechanism to rotate said output of said transmission, a drive belt, means including said driver belt to connect one of said two driver shafts to the engine, means to power the other of said two driver shafts including an input pulley and a variator pulley and a driver pulley, said input pulley being connected to said one of said two driver shafts, a first belt, said first belt connecting said input pulley to said variator pulley, said first belt being different than said driver belt, said driver pulley being connected to the other of the two driver shafts, a second belt, said second belt connecting said variator pulley to said driver pulley, said means to power the other of said two driver shafts being on the opposite side of said differential gearing mechanism from said means including said drive belt to connect one of said two driver shafts to the engine, a second differential and said second differential being connected directly to said output of said differential gearing mechanism.

11. The improved transmission of claim 10 characterized in that said two driver shafts and said output of said differential gearing mechanism, said input pulley, said variator pulley, said driver pulley and said second differential have axis of rotation respectively and said axes of rotation being parallel to each other.

12. The improved transmission of claim 10 wherein the differential gearing transmission has a housing and the axis of rotation of said variator pulley is fixed in respect to the housing of the differential gearing transmission.

13. An improved differential gearing transmission for use with a source of power comprising a differential gearing mechanism, said differential gearing mechanism having two driver shafts and an output with the rotation of said two driver shafts acting through said differential gearing mechanism to rotate said output, a drive belt, means including said drive belt to connect one of said two driver shafts to said source of power, an input pulley, said input pulley being connected to said one of said two driver shafts, a variator pulley, said variator pulley being located at a fixed location in respect to said two driver shafts, said variator pulley having two grooves, a first belt, said first belt drivingly connecting said input pulley to one groove of said variator pulley, said first belt being different than said drive belt, a driver pulley, said driver pulley being connected to the other of said two driver shafts, a second belt, said second belt drivingly connecting said second groove of said variator pulley to said driver pulley, said input pulley and said driver pulley rotating at certain speeds respectively and means to selectively alter the relative speeds of said input pulley and said driver pulley.

14. The improved transmission of claim 13 wherein the two grooves of said variator pulley have effective diameters and characterized in that a movable central element separates said two grooves of said variator pulley, sand movable central element varying the effective diameters of said two grooves, and wherein said means to selectively alter the relative speeds of said input pulley and said driver pulley includes said movable central element.

15. The improved transmission of claim 14 characterized by the addition of means to selectively cause the movement of said movable central element so as to vary the effective diameter of said two grooves.

16. An improved differential gearing transmission for use with a source of power comprising a differential gearing mechanism, said differential gearing mechanism having two driver shafts and an output with the rotation of said two driver shafts acting through said differential gearing mechanism to rotate said output, a drive belt, said drive belt connecting one of said two driver shafts to the source of power, an input pulley, means to connect said input pulley to said one of said two driver shafts, a variator pulley, said variator pulley having two grooves, a first belt, said first belt being different than said drive belt, said first belt drivingly connecting said input pulley to one groove of said variator pulley, a driver pulley, means to connect said driver pulley to the other of said two driver shafts, a second belt, said second belt drivingly connecting said second groove of said variator pulley to said driver pulley, said input pulley and said driver pulley rotating at certain speeds respectively, means to selectively alter the relative speeds of said input pulley and said driver pulley, said two grooves of said variator pulley having effective diameters, a movable central element separating said two grooves of said variator pulley, said movable central element varying the effective diameters of said two grooves, said means to selectively alter the relative speeds of said input pulley and said driver pulley including said movable central element, means to selectively cause the movement of said movable central element so as to vary the effective diameter of said two grooves, one of said first belt and said second belt having an effective length and characterized in that said means to selectively cause the movement of said movable central element includes an operative arm and said operative arm selectively altering the effective length of one of first said belt or said second belt with such selective alteration of said effective length moving said central element.

17. The improved transmission of claim 16 wherein the differential gearing transmission has a housing and the axis of rotation of said variator pulley is fixed in respect to the housing of the differential gearing transmission.

18. An improved transmission comprising a housing, a central rotary shaft, means to rotatively mount said central rotary shaft to said housing, said central rotary shaft having a sun gear intermediate to two ends, means to connect one end of said central rotary shaft to an engine, an input pulley, said input pulley being connected to the other end of said central rotary shaft, a variator pulley, means to rotatively mount said variator pulley to said housing, said variator pulley having two grooves separated by a movable central element the movement of which varies the effective diameter of said two grooves, a belt, said belt drivingly connecting said input pulley to one groove of said variator pulley, a driver pulley, means to rotatively mount said driver pulley to said housing, a second belt, said second belt drivingly connecting the other groove of said variator pulley to said driver pulley, a ring gear, means to rotatively mount said ring gear to said housing with said ring gear surrounding said sun gear, means to drivingly connect said driver pulley to said ring gear, planet gears, said planet gears being located between said ring gear and said sun gear drivingly interconnecting said ring gear and said sun gear, a planet carrier, means to connect said planet gears to said planet carrier such that rotation of said planet gears about said sun gear rotates said planet carrier, an output for the transmission, means to connect said planet carrier to said output for the transmission, and means to selectively move said moveable central element of said variator pulley to alter the respective speeds of rotation of said input pulley and said driver pulley so as to alter the speed and direction of rotation of said output for the transmission.

19. The improved transmission of claim 18 wherein said central rotary shaft, said input pulley, said variator pulley, said driver pulley, said ring gear and said planet carrier have axis of rotation and characterized in that said axis of rotation are all parallel.

20. The improved transmission of claim 18 characterized in that said means to selectively cause the movement of said movable central element includes an operative arm and said operative arm selectively altering the effective length of one of said belt or said second belt with such selective alternation moving said central element.

21. In a transmission having a differential gearing mechanism having two driver shafts and an output, and a variator mechanism having pulleys, the two driver shafts, the output and the pulleys each having an axis of rotation the improvement of the axis of rotation of the two driver shafts and output of the differential gearing mechanism, the pulleys of the variator mechanism being parallel, the output of the differential gearing mechanism is connected to an output mechanism having axles and the axis of rotation of the axles of the output mechanism being parallel to the axis of rotation of the two driver shafts and output of the differential gearing mechanism and the pulleys of the variator mechanism.

22. In an engine driven transmission having a differential gearing mechanism with two driver shafts in a housing and a variator mechanism having an input for connection to an engine, and an output connected to the differential gearing mechanism via one of the driver shafts, and a variable diameter pulley, the improvement of means to connect the input of the variator mechanism to the engine through the other of the two driver shafts in the housing, and means to change the diameter of the variable diameter pulley so as to vary the relative speed of the output of the variator mechanism in respect to the input of the variator mechanism and thus vary the speed of the connection to the differential gearing mechanism.

23. In an engine driven transmission having a differential gearing mechanism in a housing and a variator mechanism having an input for connection to an engine and an output, the improvement of means to connect the input of the variator mechanism to the engine through a rotary shaft in the housing, the differential gearing mechanism having a rotary shaft in the housing and characterized in that said means to connect the input of the variator mechanism to the engine includes the rotary shaft of the differential gearing mechanism.

24. An improved differential gearing transmission for use with a source of power comprising a differential gearing mechanism, said differential gearing mechanism having a housing, two driver shafts and an output with the rotation of said two driver shafts acting through said differential gearing mechanism to rotate driving the output, a rotary shaft, said rotary shaft being in said housing, means to power said rotary shaft, said rotary shaft being one of said two driver shafts, an input pulley, said input pulley being connected to said rotary shaft, a variator pulley, said variator pulley having a diameter, said variator pulley being rotatively mounted to said housing at a fixed location in respect thereto, a first belt, said first belt drivingly connecting said input pulley to said variator pulley, a driver pulley, said driver pulley being connected to the other of said two driver shafts, a second belt, said second belt drivingly connecting said variator pulley to said driver pulley, and means to selectively change the diameter of said variator pulley so as to vary the relative speeds of said input pulley and said driver pulley and thus alter the speed of said output of said differential gearing transmission.

25. The improved differential gearing mechanism of claim 24 characterized in that said rotary shaft is the same as said one driver shaft.

26. The improved differential gearing mechanism of claim 24 characterized in that said means to selectively change the diameter of said variator pulley includes the selective alteration of the effective length of one of said first belt or said second belt.

27. The improved differential gearing transmission of claim 24 characterized in that said differential gearing mechanism is an epicyclic differential utilizing a planetary device.

28. The improved differential of claim 27 wherein said planetary device has a sun gear and characterized in that the sun gear is mounted concentrically on said one driver shaft.

29. The improved differential of claim 28 wherein said planetary device has a ring gear and a planet carrier and characterized by the addition of means for said other driver shaft to rotate the ring gear and means for the planet carrier to rotate the output of the differential gearing mechanism.

30. The improved differential gearing mechanism of claim 29 characterized in that said rotary shaft is the same as said one driver shaft.

31. The improved differential gearing transmission of claim 24 characterized by said output of said differential gearing mechanism being drivingly connected to an output mechanism including an axle and a differential.

32. An improved differential gearing transmission comprising a differential gearing mechanism, said differential gearing mechanism having a housing, two driver shafts and an output with the rotation of said two driver shafts acting through said differential gearing mechanism to rotate said output, means to power one of said two driver shafts, a rotary shaft, said rotary shaft being in said housing, means to power said rotary shaft, an input pulley, said input pulley being connected to said rotary shaft, a variator pulley, said variator pulley having a diameter, said variator pulley being rotatively mounted to said housing, a first belt, said first belt drivingly connecting said input pulley to said variator pulley, a driver pulley, said driver pulley being connected to said other driver shaft, a second belt, said second belt drivingly connecting said variator pulley to said driver pulley, means to selectively change the diameter of said variator pulley so as to vary the relative speeds of said input pulley and said driver pulley and thus alter the speed of said output of said differential gearing transmission, said output of said differential gearing mechanism being drivingly connected to an output mechanism including an axle and a differential, and said one driver shaft, said other driver shaft, said variator pulley and said axle having parallel axis of rotation.

33. The improved transmission of claim 32 wherein the axis of rotation of said variator pulley is fixed in respect to the housing of the differential gearing transmission.

34. An improved differential gearing transmission comprising a differential gearing mechanism, said differential gearing mechanism having a housing, a planetary mechanism with a sun gear and a ring gear, two driver shafts and a planet carrier output with the rotation of said two driver shafts rotatably driving the output of said transmission, means to power one of said two driver shafts, said sun gear being concentrically mounted on said one driver shaft, an input pulley, said input pulley being connected to said one driver shaft, a variator pulley, said variator pulley having a diameter, said variator pulley being rotatively mounted to said housing at a fixed location in respect thereto, a first belt, said first belt driving connecting said input pulley to said variator pulley, a driver pulley, said driver shaft being connected to said driver shaft, means to drivingly connect said other driver shaft to said ring gear, a second belt, said second belt driving connecting said variator pulley to said driver pulley, means to selectively change the diameter of said variator pulley so as to vary the relative speeds of said input pulley and said driver pulley and thus alter the output speed of said planet carrier output of said differential gearing mechanism, an output mechanism including an axle and a differential, and means for the planet carrier output of said differential gearing mechanism to drivingly rotate said output mechanism.

35. An improved differential gearing mechanism for use with an engine comprising of a differential gearing mechanism, said differential gearing mechanism having a housing and two driver shafts and an output with a rotation of said two driver shafts acting through said differential gearing mechanism to rotate said output, means to power one of said two driver shafts by the engine, an input pulley, a variator pulley, a driver pulley, said input pulley being connected to said one of said two driver shafts, a first belt, said first belt connecting said input pulley to said variator pulley, the axis of rotation of said input pulley and the axis of rotation of said variator pulley being a fixed distance apart, said driver pulley being connected to the other of the two driver shafts, a second belt, said second belt connecting said variator pulley to said driver pulley, and said axis of rotation of said variator pulley being located a fixed distance away from said axis of rotation of said driver pulley.

36. The improved transmission of claim 35 wherein said axis of rotation of said input pulley and the axis of rotation of said variator pulley and the axis of rotation of said driver pulley are fixed in respect to the housing of the improved differential gearing mechanism.

37. The improved transmission of claim 36 characterized in that said variator pulley has two grooves, said first belt engaging one of said two grooves of said variator pulley, said second belt engaging the other of said two grooves of said variator pulley, said two grooves having effective diameters, a moveable central element separating said two grooves of said variator pulley, said moveable central element varying the effective diameters of said two grooves of said variator pulley simultaneously, and means to selectively cause the movement of said moveable central element so as to vary the effective diameter of said two grooves so as to alter the relative speeds of rotation between said input pulley and said driver pulley.

38. The improved transmission of claim 37 wherein one of said first belt and said second belt has an effective length and characterized in that said means to selectively cause the movement of said moveable central element includes an operative arm and said operative arm selectively altering the effective length of one of said first belt or said second belt with said selective alteration moving said central element.

39. The improved transmission of claim 35 characterized in that said means to power one of said two driver shafts by the engine is on the opposite side of said differential gearing mechanism from said input pulley and said variator pulley and said driver pulley.

* * * * *